United States Patent [19]

Cobb et al.

[11] 3,835,998

[45] Sept. 17, 1974

[54] EDGE LOCATING APPARATUS

[75] Inventors: Richard O. Cobb; James Lipp, both of Poughkeepsie, N.Y.

[73] Assignee: International Business Machine Corporation, Armonk, N.Y.

[22] Filed: July 2, 1973

[21] Appl. No.: 375,985

[52] U.S. Cl.. 209/111.7, 235/61.11 E, 340/174.1 C

[51] Int. Cl. .............................................. B07c 5/342

[58] Field of Search ............... 340/174.1 C, 173 LT; 209/80.5, 111.7; 250/219 DQ; 235/61.11 E

[56] References Cited

UNITED STATES PATENTS

| | | | |
|---|---|---|---|
| 3,130,393 | 4/1964 | Gutterman | 340/174.1 R |
| 3,684,865 | 8/1972 | Sakamoto | 235/61.11 E |
| 3,731,060 | 5/1973 | Weinstein | 209/80.5 X |
| 3,738,487 | 6/1973 | Way | 209/111.7 X |

*Primary Examiner*—Richard A. Schacher
*Attorney, Agent, or Firm*—Robert Lieber

[57] ABSTRACT

Flexible storage sheets of a laminar file assembly are sensed in multiple by stationary sensors. Resultant signals are used to control operation of a partitioning blade mechanism relative to randomly selected sheet interfaces and to verify integrity of such operation. Sheets unmasked by a cursor mask registered with the blade tip are sensed in multiple by stationary optics and photoelectronics. The photoelectronic signals are repeatedly sampled, staticized and counted by shifting and counting electronics. The count derived from each sample represents the instantaneous location of the blade tip relative to the sheets. The counts are used to indicate: sheet stability (e.g., for predictive or extrapolative control relative to continually moving sheets), instantaneous location of a specific sheet interface relative to the partitioning mechanism and/or integrity of a partitioning operation currently in progress. Due to the multiple sensing organization subject apparatus is virtually insensitive to transient error in the sensors or electronics. Errors are not cumulative since the count derived from each sample represents a complete information (addressing) entity.

17 Claims, 12 Drawing Figures

FIG. 8

EDGE LOCATING APPARATUS

CROSS REFERENCE TO RELATED PATENT APPLICATIONS

The following co-pending patent application filed simultaneously herewith discloses related subject matter and relevant portions of the disclosure therein are intended to be incorporated herein by this and subsequent references thereto:

U.S. Patent application Ser. No. 375,989 filed July 2, 1973 by R. A. Barbeau, B. W. McGinnis, A. W. Orlando, J.A. Weidenhammer entitled "Partitionable Disc Memory With Flexible Discs and Conformally Suspended Head."

BACKGROUND OF THE INVENTION

1. Field of the Invention

The invention pertains to access locational apparatus for random access storage file assemblies in which multiple flexible record sheets, stacked close together in a laminar configuration, are subject to separation at ramdonly selected interfaces to provide transducing access to otherwise confined surfaces of individual sheets.

2. Prior Art

U.S. Pat. No. 3,130,393 to R. P. Gutterman describes a laminar configuration of multiple rotating magnetic discs slideable on a rotating spindle. Access to individual discs to form a transducing work space is accomplished by directing fluid (air) under pressure between randomly selected discs. Location of such disc interfaces is accomplished by a slideable sensor which moves past the disc edges one at a time. Outputs of the sensor representing passage of edges are cumulatively counted by digital electronics. The cumulative count is used to determine the location of the pressurized air nozzle relative to a desired interface.

A disadvantage of the foregoing arrangement is that the required axial motion of the sensor may have a degrading effect on access time and accuracy. Consider for instance the possible occurrence of transient error in the cumulative count. If the error is detectable, and this may not always be the case, correction is required. Correction can be accomplished either by electronically altering the count or by physically re-locating the sensor to a reference position and re-initiating its movement toward the desired interface. The latter option is obviously time consuming. However alteration of the count is difficult since it requires establishment of the magnitude of the error when even the occurrence of error may be uncertain; e.g., consider the difficulty of detecting error due to momentary malfunction of the sensor.

Another disadvantage or potential problem is that in a practical environment discs cannot be guaranteed to have perfectly uniform circumferential thickness. Thus, in an organization of continuously rotating discs, variations in circumferential disc thickness could affect the accuracy of location of the desired interface. If the discs are ultra thin and flexible, the maintenance of locational accuracy becomes even more difficult. An organization of this type, with advantages over the Gutterman arrangement and characterized by flexible partitioning action concentracted over a small circumferential section of the cylindrical volume of disc rotation, is described in the above cross-referenced application by R. A. Barbeau, B. W. McGinnis, A. W. Orlando and J. A. Weidenhammer.

SUMMARY OF THE INVENTION

The problems and disadvantages of the access locational technique described in the Gutterman patent can be avoided by means of the present invention. Basically, the present invention contemplates concurrent sensing of all discs between the partitioning mechanism and a stationary end plate by means of stationary photoelectronics and associated sampling and counting logic. The partitioning mechanism described in the above cross-referenced patent application comprises an aerodynamically stabilized blade mounted for translation relative to the discs. By means of the presently disclosed invention the blade is subject to instantaneous control while it and the discs are in motion. Electronic sampling and logical processing circuits determine instantaneously in a small fraction of a disc rotation period whether a randomly designated disc interface is effectively in registration with the tip of the blade at the time of any sample. When registration (either immediate or extrapolated) is ascertained, the blade is coordinately actuated to enter the interface and form a stable space suitable for accommodating a transducer; as more fully described in the above cross-referenced patent application by R. A. Barbeau, B. W. McGinnis, A. W. Orlando and J. A. Weidenhammer. As the blade moves into the interface the sensors may be sampled to provide checking indications enabling the electronic logic to determine whether the interface actually selected by the blade corresponds to the designated or desired interface.

According to a more specific aspect of the subject invention a rotating laminar disc array, having varied disc diameters for edge discrimination, is illuminated over its axial length. Stationary sensory apparatus (monolithically co-packaged photodiodes or charge coupled devices, or a TV camera, etc.) receives finely resolved grating like images of all disc edges and interfaces between a determine reference (end plate) and the tip of the partitioning blade. Electrical signals produced concurrently by the sensory apparatus are sampled, staticized and electronically processed as one information unit to provide address information useful apart from other sensory information to indicate the instantaneous position of the blade tip relative to a designated interface. Such indications are useful to develop further indications: of axial disc stability (thickness runout, fluctuation, jitter, etc.) incidental to controlling blade operation (e.g, for position extrapolation, etc.), of axial positioning of the blade relative to a specific interface, and of the integrity of blade operation relative to a specific interface.

According to still another feature of the invention, a mask (cursor shroud) positionable in registry with the blade tip, masks the discs located to one side of the tip while allowing transfer of light from the other discs to oppositely situated photo-receptors. Thus there is immediate correlation between electronic counts developed from light images concurrently perceived by the photo-receptors and the instantaneous position of the blade relative to any specific disc interface. When a developed count and a pre-designated disc interface address coincide, indicating alignment of the blade tip with the designated disc interface, the blade may be immediately advanced into the interface to form a stable work space for a transducer; as described in the above cross-referenced application. While the blade is advancing into the interface the mask is moved to an unobstructive position to permit checking of the authenticity of blade operation. This permits sampling and electronic counting of representations of all disc edges between the work space and end plate. From this it is possible to determine whether the interface actually entered by the blade corresponds to the predesignated interface address.

This is considered to be an important function since the obvious (but slower) alternative would be to wait for emplacement of the transducer in working relation to the interfacing disc and the sensing of recorded information identifying the disc.

The foregoing and other features and associated objectives of the subject invention will be more fully appreciated and understood by reference to the following detailed description and claims.

DETAILED DESCRIPTION

Referring to FIGS. 1–6, the assembly of stationary plate 4*a*, rotating flexible magnetic discs 8 and blade 28 (described more fully in above cross-referenced patent application by R. A. Barbeau, B. W. McGinnis, A. W. Orlando. J. A. Weidenhammer, operates as a random access storage file. The continuously rotating discs (operating in an unpressurized environment) are partitioned for transducing access by movement of blade 28 into randomly selected disc interfaces. Plate 4*a* and other stabilizing means not shown (but shown and described in the above cross-referenced application) serve to stabilize the rotational motion of the discs and to damp fluttering movements due to turbulence resulting from the partitioning action of the blade. The discs 8 rotate at high speed (e.g., 1,800 rpm) and are ultrathin (e.g., mylar sheets coated with magnetic oxide to a composite thickness of 0.0017 inches). Consequently, the accuracy and integrity of operation of the blade is quite important.

Figure 1:
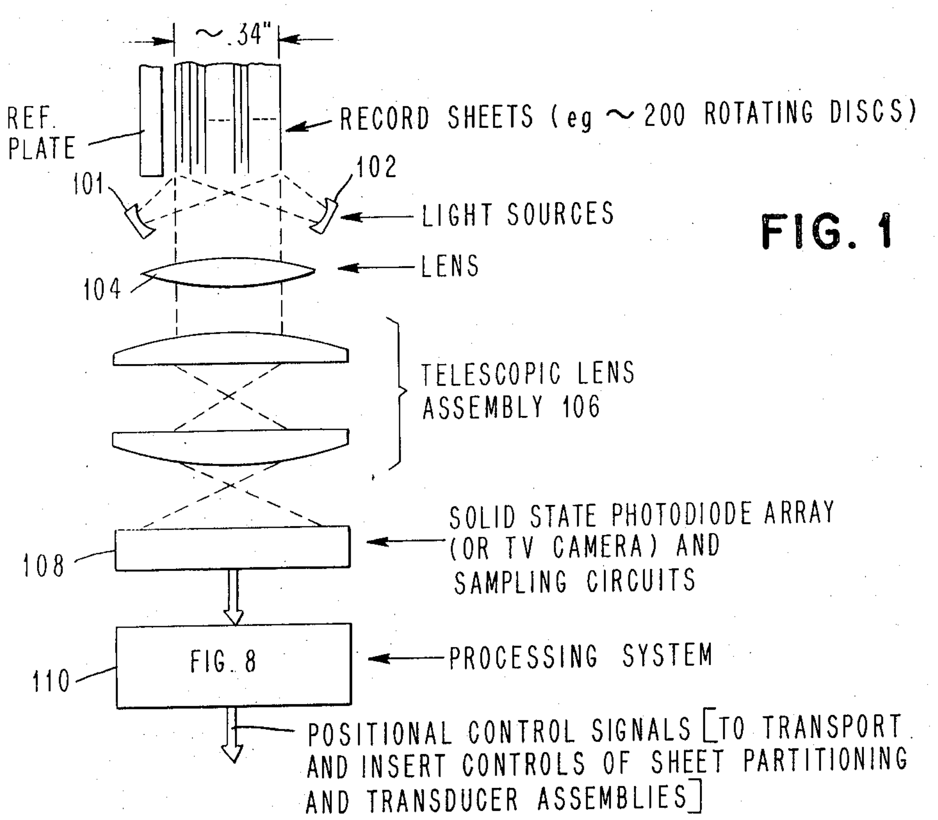
FIG. 1 illustrates an embodiment of the invention based upon sensing of radiation (light) reflected from rotating flexible discs.
Figure 2:
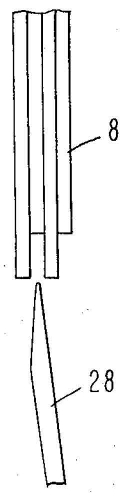
FIGS. 2–6 indicate presently relevant details of a disc organization and deflecting (partitioning) blade full described in the above cross-referenced patent application.
Figure 3:
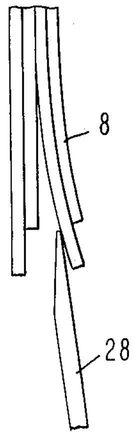
Figure 4:
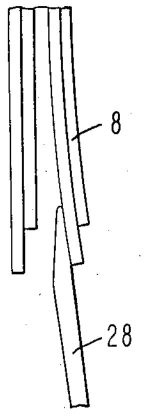
Figure 5:
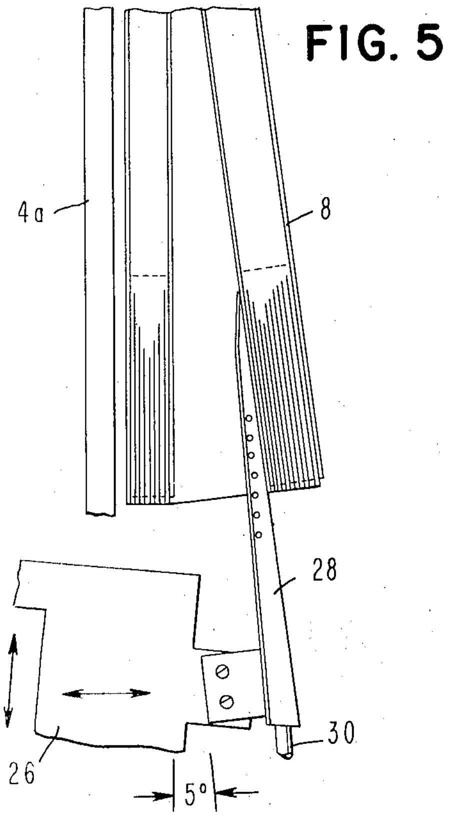
Figure 6:
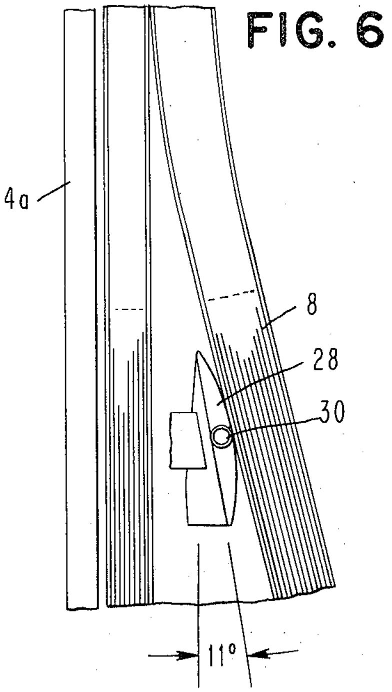

In order to unambiguously locate the disc interface relative to which the blade should operate, the subject apparatus according to the embodiment shown in FIG. 1 employs a pair of light sources 101, 102 which obliquely illuminate a small arc segment of the path of rotation of all discs. The discs have varied diameters (FIGS. 2–4) and light deflected from the larger diameter discs is collected by means of lens 104 and telescopic lens assembly 106 and focused upon discrete elements of a stationary array 108 of monolithically copackaged photo-diodes (or charge coupled devices). The latter may be arranged parallel to the axis of disc rotation. The diode outputs are processed by digital electronics 110. Alternately, a TV camera with a narrow raster scanning slit (e.g., a single line scan) may be employed in place of the diode array.

The photo-diodes of array 108 can be fabricated to width resolutions of 0.0003 inches requiring some 1,000 photo-diode positions for sensing the exemplary array of 200 discs (i.e., five diodes per edge).

An experimental configuration employed to demonstrate feasibility utilized a pair of microscope lamp illuminators (Bausch and Lomb Model 31-33-53) to illuminate the target area of the disc edges. For focusing and telescopic optics, a pair of lenses was used (lens 1: Micro Nikor 1:3.5/50; and lens 2: Comparon 1:5.6/150 Schneider-Kreuznack No. 10795354). The photodiode array was a "solid state line scanner," Model RL-64P purchased from Reticion Corporation, 365 MIddlefield Road, Moutain View, California. TTL circuits were used to drive the photo-diodes and an oscilloscope (Tektronics Model 7704) was employed to provide visual indication of the signals produced by the photo-diodes. The disc array consisted of 200 sheets of the above-referenced thickness and 1,000 photodiodes were used. It was observed that locations of individual disc edges and interfaces relative to a positional reference could be distinguished with a signal to noise characteristic of 5:1, even in the presence of induced axial motion in the disc array.

Figures 7, 9, 10:
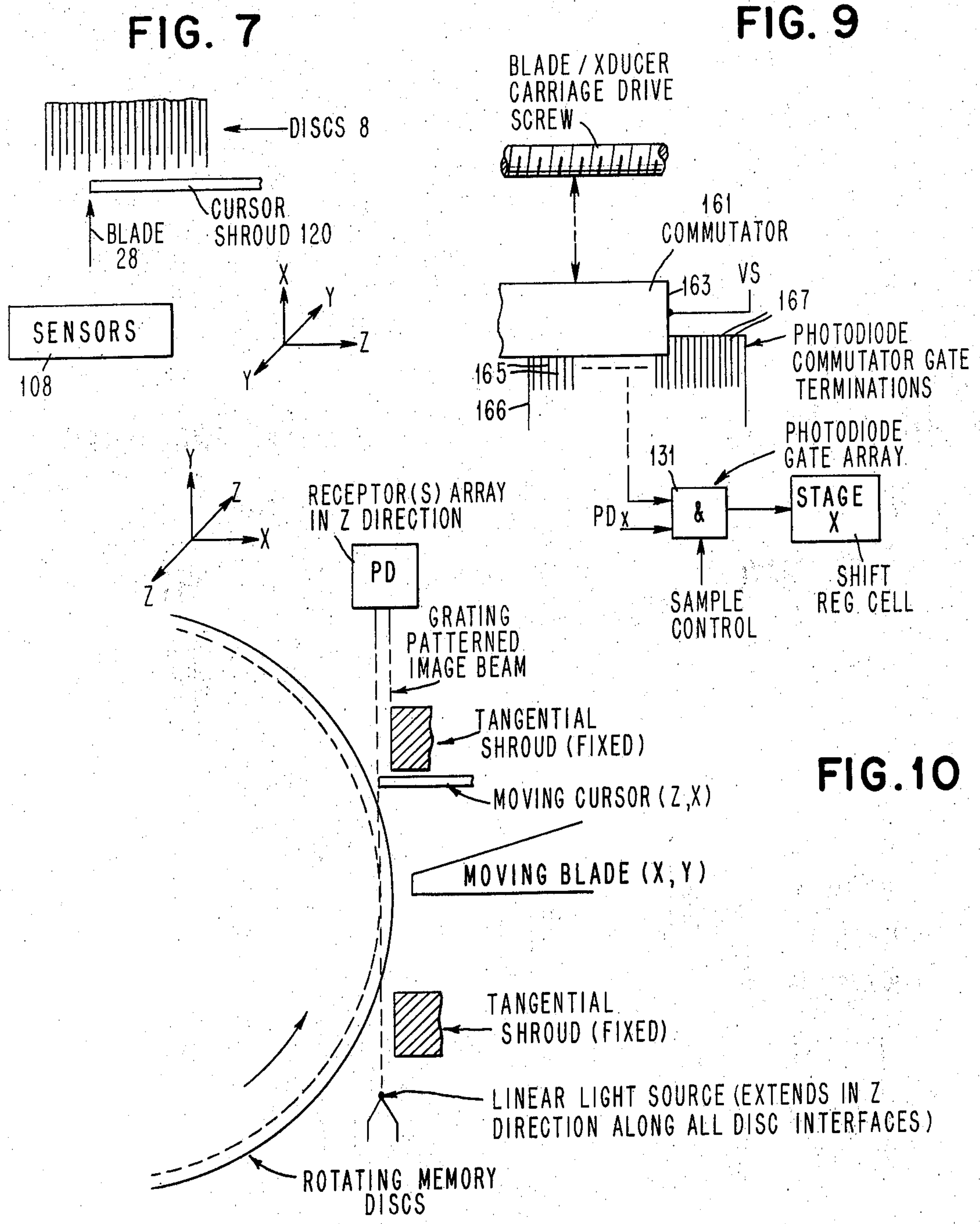
FIG. 7 schematically indicates integration of the sensor elements and mask (cursor shroud) of the subject invention into the disc organization characterized in FIGS. 2–6.
FIG. 9 illustrates an alternate cursor (blade location) mechanism which does not interact optically with the sensors and thereby does not obscure the image of disc edges perceived by the edge sensor.
FIG. 10 illustrates an alternate form of illumination in which light is transferred through peripheral spaces defined by the varied diameters of successive discs and selectively masked relative to the photosensors by a "cursor shroud" aligned with the blade tip.

FIG. 7 indicates that by interpositioning a masking shroud 120 between the discs and sensors 108, with one end of the shroud maintained aligned with the tip of the blade, only discs to one side of the blade tip (for instance to the left of the blade tip as indicated in FIG. 7) are sensed. This simplifies the logic for determination of relative positions of disc interfaces and blade tip.

Figure 8:
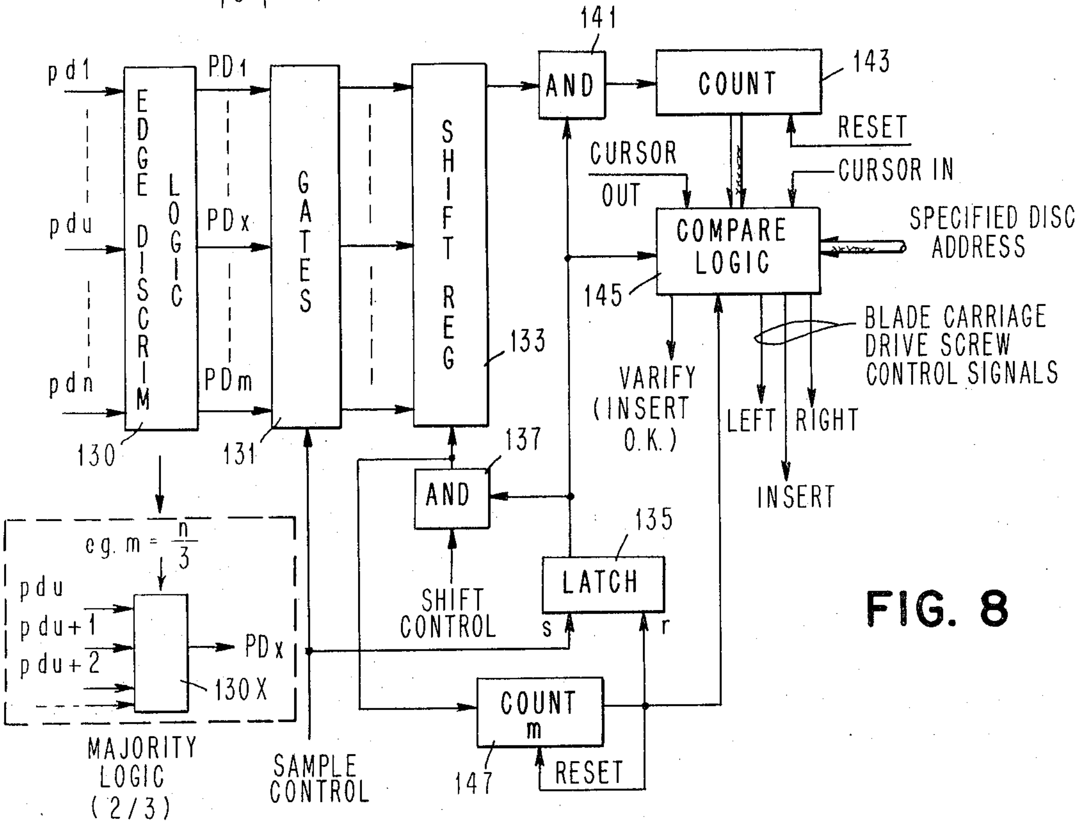
FIG. 8 schematically illustrates electronic processing logic for determining the physical location of the deflecting blade relative to specific disc interfaces and for developing control signal functions useful to control and verify deflecting operations of the blade relative to the discs.

The manner in which electronic logic 110 (FIGS. 1, 8) operates relative to photo-diodes to ascertain relative positions of specific disc interfaces and blade 28 is explained with reference to FIG. 8. Assume for instance that the light reflected by a single disc edge is focused upon an area of array 108 corresponding to the area covered by five photo-diodes. The outputs of the photo-diodes would be transferred in groups of five to majority voting logic circuits 130; a specific example of which is indicated at 103$_x$. Each voting logic circuit thereby delivers an output uniquely indicative of receipt of edge or interface illumination (edge if three or more of the respective inputs are in a condition of illumination; interface otherwise).

When a TV camera (vidicon) is used instead of a photo-diode array, the scanned video signals should be relatively staticized (e.g., in a shift register) prior to transfer to the voting circuits.

The parallel binary outputs $PD_1$–$PD_m$ ($m$ = one fifth the number $n$ of diodes = the number of discs) of the voting circuits are sampled in parallel by individual gates 131 into $m$-stage shift register 133; the gates 131 being conditioned by "sample control" pulses which may have arbitrary timing. The same control pulse also sets latch 135 enabling AND circuit 137 to transfer shift control (clock) pulses to shift the contents of register 133 in an open ended shift. AND circuit 141 enabled by setting of latch 135 couples the lowest order shift stage to counter 143. Counter 143 is preset at the time of the sample control pulse to a predetermined count state (either to a zero state or to the state representing the complement of a pre-designated disc interface address). Recalling that the shroud 120 of FIG. 7 masks all disc interfaces and edges to the right of the blade tip, and noting that gates 131 deliver 1's excitation in response to edge reflection illuminative of respective photo-diode groups, it will be appreciated that the total number of 1's sampled into shift register 133 and counted by counter 143 should correspond to the number of disc edges visible to the photo-diodes (i.e., between the blade tip and plate 4*a* of FIG. 1). Thus, if the counter is initially preset to a zero value, after m shifts the count would be indicative of the number of discs instantaneously situated between the blade and plate 4*a* subject to the comparatively negligible sampling and counting delay). The count may be compared by comparison logic 145 to the pre-designated address of the interface to be partitioned, and the "high/low/equal" result can be used to provide "left/right/insert" control functions to move blade 28 left, right or inward relative to the disc edges. Completion of m shifts is indicated to comparison logic 145 by overflow of counter 147 which counts the shift control pulses transferred by AND circuit 137. Overflow of counter 147 also resets latch 135 and resets counter 147 terminating the shift sequence.

If counter 143 is present to the complement of the designated disc interface address the comparison reduces to sensing whether the count after m shifts is positive, negative or zero.

Errors in the foregoing process are non-cumulative since every sample is independent of every other sample. Thus each count developed by counter 143 is an independently useful information entity. Consequently, while the blade is moved left or right transient errors in the sensing or electronic processing functions are "transparent" to the processing electronics.

Upon "insert" control, as the blade enters a disc interface it skews to the right (as described in the above cross-referenced application) so that its tip is no longer registered with the end of cursor shroud 120. Accordingly, when using the subject apparatus and electronic logic to check the position of the entering blade the shroud is moved to a non-obstructive position ("Cursor Out") in which it does not mask the light received by the photo-diodes. In this case the deflected discs to the right of the blade are either out of the imaging range of the diodes (in which case counter 143 will count only disc edges to the left of the blade) or additional logical control may be applied to AND 141 to stop the counting operation of count 143 after s successive zeroes are shifted tocounter 143 (s corresponding to the width of an unambiguously distinguishable opening made by the blade). Such additional logic may be incorporated in logic 145 to compare the count to the preceding count in each shift cycle and to count the number of matching comparisons. In either case the count developed at 143 after m shifts should be equal to the pre-designated address ("insert O.K.") if the blade has entered the correct disc interface. When this is not so, error (NOT VERIFY) is indicated requiring removal of the blade, re-positioning of the cursor mask ("CURSOR IN") and repetition of the interface location process.

An alternate usage for the indicated logic and apparatus would be to repeatedly determine the difference between counts developed in counter 143, after sampling and m shifts, and the pre-specified address with the blade held stationary (disabling the left/right control signal paths). This would provide an indication of the stability of the discs (i.e., axial runout and flutter) and might be useful as a second order input to the blade positioning controls; e.g., to reduce the possibility of inserting the blade into an erroneous disc interface.

With discs rotating at the above mentioned nominal rate of 1,800 rpm a revolution is completed every $1/1800 \times 60 \times 10^6$ microseconds = $10^5/3$ microseconds. Assuming a logical counting shifting delay of less than one-tenth microsecond, well within the capability of present day electronics, 800 shifts (one sampling — shifting — counting sequence) would be completable in less than 80 microseconds. Whence it is concluded that one sampling — shifting — counting sequence for values of $m$ (numbers of discs) up to 800 could be executed in less than the time required for 1° of disc rotation ($10^5/3 \times 360 = 10^3/10.8 = 92$ microsec). It is thereby understood that the sampling-shifting-counting process is finely resolvable relative to the disc dynamics and can be used for position extrapolation as well s definition.

Should it become inconvenient or optically unsatisfactory to deploy a cursor mask such as 120 (FIG. 7) the arrangement of FIG. 9 can be used. In this arrangement the position of the blade tip prior to insertion — corresponding to the position of the blade carriage drive screw — is distinctly manifested electronically; e.g., by association with commutating member 161. Right-hand edge 163 of member 161 corresponds positionally to the effective position of the blade tip relative to the disc interfaces. Printed circuit conductors 165 on stationary pad 166 are thereby contacted by member 161 and thereby connected to signal voltage source $v_s$ whereas printed circuit conductors 167 which are not contacted do not receive signal energization. Now assuming that there is one such printed circuit conductor for each of the $m$ gates 131 of FIG. 8, it will be appreciated that the information transfer relative to the $m$ stages of shift register 133 FIG. 8) will be electrically "shrouded" or "masked" at gating positions conditioned by the non-contacted conductors 167. Thus the information delivered by means of the arrangement suggested in FIG. 9 would correspond to the information transferred to the shift register by the cursor arrangement indicated in FIG. 7.

Alternatively, if the blade carriage is driven by a step motor the forward and reverse step pulses to the motor may be cumulatively counted in a forward/backward ring counter and the resultant "string of 1's" count may be utilized to condition the sampling gates 131.

Figure 12:
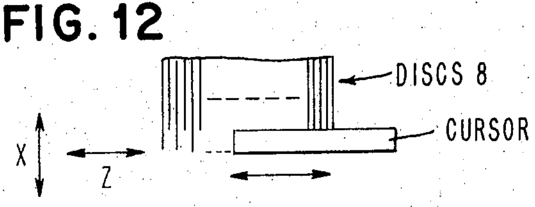
FIG. 12 illustrates the relative positions of the cursor and discs in the organization of FIG. 10.
Figure 11:
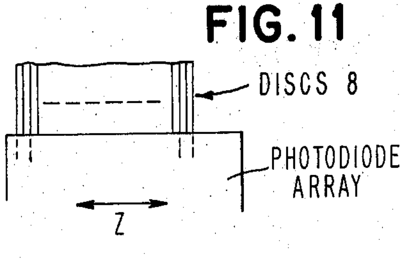
FIG. 11 indicates the relative positions of the sensory photo-diodes and discs in the organization shown in FIG. 10.

FIG. 10 indicates an alternate embodiment in which illumination is transferred directly to the photo-diodes through the spaces between the discs rather than by reflection from the disc edges. The relatively parallel source of light and photo-diodes are symmetrically situated respectively below and above the line of blade operation. Fixed masks (tangential shrouds) tangential to the large diameter discs confine the light perceivable by the photo-diodes (PD) to the spaces between the large and small diameter discs. The perceivable light is further masked in the axial ($z$) direction by the moving cursor shroud registered with the blade tip. FIGS. 11 and 12 indicate that the photo-diodes span all disc interfaces and the cursor shroud is positioned to mask all disc interfaces to the right of the blade tip relative to the photo-diodes.

The foregoing arrangement provides "ones" excitation at disc interfaces and "zeroes" excitation at disc eges. Hence the sensed signals may require inversion before handling by the logic of FIG. 8.

While the invention has been particularly shown and described with reference to a preferred embodiment thereof it will be understood by those skilled in the art that various changes in form and detail may be made therein without departing from the spirit and scope of the invention.

What is claimed is:

1. In a random access storage file assembly, including a stack of multiple relatively displaceable record sheets in closely spaced configuration coactive with access apparatus subject to variable positioning relative to said stack for securing access to confined surfaces of randomly designated sheets, locational apparatus useful to control positioning of the access apparatus comprising:

means operable without physical movement relative to the assembly to simultaneously sense edges of all sheets located between a predetermined reference position and a varaible position in the assembly; said variable position having predetermined correspondence to the position of said access apparatus; and means coupled to said edge sensing means for producing electrical signals useful to instantaneously sample and count said edges and thereby track the instantaneous position of the access apparatus relative to a predetermined edge of a randomly designated sheet in the stack.

2. Apparatus according to claim 1 wherein the sensing means comprises multiple discrete edge sensing devices arranged for discrete radiant energy communication with edges of any and all sheets in the stack.

3. Apparatus according to claim 1 wherein the sensing means comprises an electronic scanning device arranged for radiant energy communication with said stack to provide scanning of an image of any and all of said sheet edges over a time interval which is short by comparison to the shortest time anticipated for the position of the access apparatus relative to the stack to vary by one sheet thickness.

4. Apparatus according to claim 1 wherein said tracking means is operable to sample the output of said edge sensing means and produce said tracking signals at intervals shorter than the shortest time anticipated for the position of said access apparatus to vary relative to said stack by the thickness of a single sheet.

5. Apparatus according to claim 1 wherein said sensing and tracking means are operable alternately to track said access apparatus before and after displacement operations thereof relative to said stack, for access locational and verificational usage, respectively.

6. Apparatus according to claim 2 wherein the sensing means comprises integrally co-packaged photocells and circuits in an LSI unit.

7. Apparatus according to claim 6 wherein said sensing means comprises a source of light arranged to obliquely illuminate said edges and focusing optics positioned to image said light on said photocells after reflection from said edges.

8. Apparatus according to claim 7 wherein individual said devices are dimensioned smaller than the focused images of individual said edges so that said devices provide finely resolved discrimination of portions of said edges and spaces between successive said edges.

9. Apparatus according to claim 1 wherein the said record sheets are coaxially supported circular magnetic recording discs arranged to be continuously rotated at high speed relative to said access apparatus and locational apparatus and wherein said sensing and tracking means are co-operative to provide sampled tracking signals at intervals shorter than the time required for a single revolution of the discs; said tracking signals being useful independently of preceding tracking signals whereby error in individual said signals does not disable the access apparatus or require large repositioning displacements thereof.

10. Apparatus according to claim 9 wherein the sensing means comprises monolithically co-packaged photocells and associated circuits.

11. Apparatus according to claim 10 wherein the photocells are arranged to receive focused light images of the said edges and of intercellular spaces between edges and dimensioned so that images of individual said edges are focused on plural said photocells to permit fine grain positional discrimination of said individual edges.

12. Apparatus according to claim 9 wherein the discs are thin flexible foils accessible by deformation so that said edges are subject to having a positional variations during a single said revolution, and the sensing and tracking means are organized to coactively track the motion of said discs relative to said access apparatus at fractional intervals within the period of a single revolution.

13. Apparatus according to claim 12 wherein the access apparatus includes a blade for selectively partitioning the path of rotation of the discs and said sensing and tracking means are operative to track the motion of the blade before it partitions the said path and to verify the positional integrity of the blade relative to said discs while it is effecting said partitioning.

14. Apparatus according to claim 12 wherein the access apparatus comprises a rigidly suspended blade operative to selectively partition the path of rotation of the pack at randomly selected disc positions and wherein the sensing means is coactive with a sighting member mounted for movement in two positions, one in alignment with the tip of the blade when the rotation path is unpartitioned, so that said member is subject to being sensed as a positional reference for said blade tip, and the other position in an unobstructive relation to the sensing means while the blade is effecting said partitioning.

15. Apparatus according to claim 9 wherein said disc edges are optically differentiated and said sensing means comprises photocells positioned to receive light incident obliquely upon and reflected from said edges.

16. Apparatus according to claim 15 wherein alternate said discs in said stack have varied diameters for edge delineation, wherein said edges are illuminated by light obliquely incident thereon and wherein said photocells are arranged to receive and react to said light upon reflection thereof from said edges.

17. Apparatus according to claim 16 wherein said light is provided by a pair of sources located symmetrically on opposite sides of a plane parallel to said discs and bisecting the stack.

* * * * *